May 15, 1945. G. J. GROSSMAN 2,375,844
TOY PARACHUTE
Filed Aug. 18, 1943
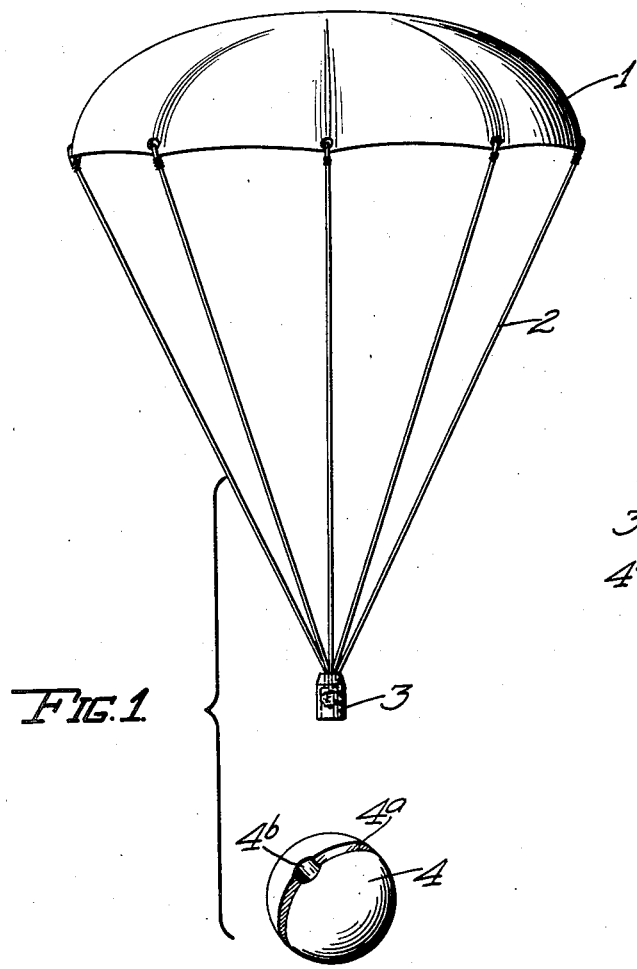
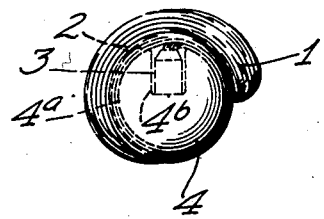
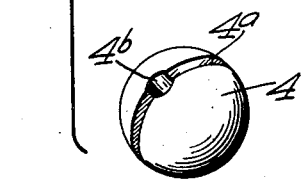
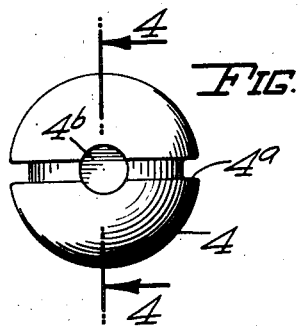
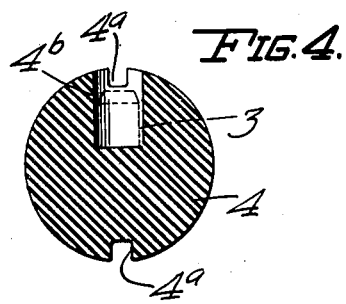
INVENTOR.
G. J. GROSSMAN
BY William C Hall
ATTORNEY.

Patented May 15, 1945

2,375,844

UNITED STATES PATENT OFFICE 2,375,844

TOY PARACHUTE

George J. Grossman, Los Angeles, Calif.

Application August 18, 1943, Serial No. 499,107

3 Claims. (Cl. 46—86)

My invention relates to a parachute apparatus, and particularly to such an apparatus intended to be used as a toy.

One of the principal objects of this invention is to provide a toy, or parachute apparatus of this class, in which a parachute may be readily projected into the air, and in which the means to facilitate the projection of the parachute into the air may be automatically released from the parachute and made to descend separately from the parachute.

Another important object of this invention is to provide a toy, or parachute apparatus of this class, in which a parachute may be projected into the air by an element or a means having considerable mass or weight, and in which the more heavily weighted element, object, or means may be readily disconnected or released from the projected parachute so that the latter, with only a small or slight balancing weight may descend very slowly, while the projecting element, object, or means, may drop rapidly.

Another object of this invention is to provide a toy of this class which is particularly simple and economical of construction, and which will not readily deteriorate or get out of order.

With these and other objects in view as will appear hereinafter, I have devised a parachute apparatus having certain novel features of construction, combination, and arrangement of parts and portions, as will be hereinafter described in detail and particularly set forth in the appended claims, reference being had to the accompanying drawing and to the characters of reference thereon, which form a part of this application, in which:

Fig. 1 is an exploded view of my parachute apparatus showing the parachute in an open condition, and in a position of descent, and showing the same separated from the projecting element;

Fig. 2 is an enlarged top view of the projecting element or ball;

Fig. 3 is a sectional view thereof, taken through 3—3 of Fig. 2; and,

Fig. 4 is a view showing the parachute wrapped around the ball preparatory to projecting the toy into the air.

The parachute shown in Fig. 1 of the drawing, is similar to other parachutes in common use, and consists of a parachute body 1, strings 2, and a weight 3. The parachute body may be made of any suitable flexible material and may have either a round or polygonal periphery. The strings 2 are attached at one end, and at intervals, to the periphery of the parachute body 1, and the other ends of the strings are attached to the weight 3. The weight 3 is preferably a small but relatively heavy tubular metal member of cylindrical shape. It is bored out at one end to receive the strings 2 and is counterbored at the opposite end to receive knots of the strings 2, to facilitate the connection of the weight to the strings.

The projecting member 4 is preferably spherical in shape and consists of a ball, preferably rubber, approximately three inches in diameter. It is provided with a circumferential groove 4$^a$ around the large diameter of the ball, and is also provided with an enlarged recess 4$^b$ at one part of the groove. This recess is wider than the groove and is also considerably deeper. The recess 4$^b$ is made large enough to receive loosely the weight 3, and the groove 4$^a$ is wide and deep enough to receive the strings 2, and a portion of the parachute body if desired. The recess is preferably of such depth that the weight is substantially flush with the bottom of the groove when the weight is located in the recess. The groove 4$^a$ in the ball provides substantially a spool with the bottom of the groove consisting of the winding portion and the side walls of the groove, or the portions of the ball forming such side walls, as the flanges of the spool.

The end of the weight toward the parachute body is preferably tapered to facilitate the withdrawal of the weight from the recess.

When the parachute is wound on the ball, as stated, it may be easily projected to a considerable height into the air. The air arrests the exposed portion of the parachute body, causing it to unwind from the spool or ball, allowing the latter to descend rapidly, while the parachute, with its much lighter weight is allowed to descend slowly.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a parachute apparatus of the class described, a parachute comprising a parachute body, strings secured at one end to the periphery of the body, and a weight secured to the opposite end of the strings, and a projecting element, the parachute being adapted to be carried by the element to facilitate projection of the parachute into the air, said element being provided with a recess for receiving the weight of the parachute, said parachute being adapted automatically to be released and to withdraw said weight from said element after having been so projected for allowing both the parachute and the projecting element to descend separately.

2. In a parachute apparatus of the class described, a parachute comprising a parachute body, strings secured at one end to the periphery of the body, and a weight secured to the opposite end of the strings, and a spool having flanges and a winding portion therebetween, and also provided with a recess adjacent the winding portion, the weight of the parachute being adapted to be located in the recess of the spool and the strings of the parachute being adapted to be wound on the winding portion between the flanges, said parachute being adapted automatically to be released from the spool by the unwinding of the strings from the winding portion and the withdrawing of the weight from said recess after the parachute and spool have been projected into the air for allowing the parachute and spool to descend separately.

3. In a parachute apparatus of the class described, a parachute comprising a parachute body, strings secured at one ond to the periphery of the parachute body, and a weight secured to the opposite end of the strings, and a ball, said ball having a circumferential groove and an enlarged recess at one side of the ball adjacent the groove, the recess being adapted to receive the weight, and the strings being adapted to be wound in said groove to facilitate the projection of the parachute into the air, said parachute being adapted automatically to be released from said ball by the unwinding of said strings from said groove and the withdrawing of said weight from said recess after the parachute and ball have been projected into the air for allowing the ball to descend separately from the parachute.

GEORGE J. GROSSMAN.